(12) United States Patent
Ishii

(10) Patent No.: US 11,465,329 B2
(45) Date of Patent: *Oct. 11, 2022

(54) CONTAINER PRODUCTION METHOD

(71) Applicant: YOSHINO KOGYOSHO CO., LTD., Tokyo (JP)

(72) Inventor: Yusuke Ishii, Tokyo (JP)

(73) Assignee: YOSHINO KOGYOSHO CO., LTD., Tokyo (JP)

(*) Notice: Subject to any disclaimer, the term of this patent is extended or adjusted under 35 U.S.C. 154(b) by 304 days.

This patent is subject to a terminal disclaimer.

(21) Appl. No.: 16/095,743

(22) PCT Filed: Mar. 21, 2017

(86) PCT No.: PCT/JP2017/011236
§ 371 (c)(1),
(2) Date: Oct. 23, 2018

(87) PCT Pub. No.: WO2017/208574
PCT Pub. Date: Dec. 7, 2017

(65) Prior Publication Data
US 2019/0240891 A1 Aug. 8, 2019

(30) Foreign Application Priority Data
May 31, 2016 (JP) .............................. JP2016-109366

(51) Int. Cl.
B29C 49/42 (2006.01)
B29C 49/12 (2006.01)
(Continued)

(52) U.S. Cl.
CPC .......... *B29C 49/4273* (2013.01); *B29C 49/12* (2013.01); *B29C 49/46* (2013.01);
(Continued)

(58) Field of Classification Search
CPC .................................................. B29C 49/4273
See application file for complete search history.

(56) References Cited

U.S. PATENT DOCUMENTS 4,926,613 A * 5/1990 Hansen .................... B65B 3/022
53/433
6,767,197 B2 * 7/2004 Boyd ..................... B29C 71/0063
425/149
(Continued)

FOREIGN PATENT DOCUMENTS

CN 106103043 A * 11/2016 ............ B29C 49/46
DE 38 34 184 C1 12/1989
(Continued)

OTHER PUBLICATIONS

Machine Translation CN106103043A (Year: 2016).*
(Continued)

*Primary Examiner* — Francisco W Tschen
*Assistant Examiner* — Wayne K. Swier
(74) *Attorney, Agent, or Firm* — Oliff PLC

(57) ABSTRACT

A container production method including a preform setup step of disposing a preform in a blow molding mold and engaging a filling nozzle with a mouth of the preform; a blow molding step of liquid blow molding the preform by supplying a pressurized liquid into the preform; a liquid discharge step of releasing the blow molding mold and pressing a trunk of the container after molding with a pressing portion that is inserted from a clearance between separated mold pieces adjacent to each other to discharge a liquid in the container to the outside of the container by a predetermined amount; and a headspace forming step of forming a headspace in the container by separating the filling nozzle from a mouth of the container.

4 Claims, 8 Drawing Sheets

(51) Int. Cl.
*B29C 49/46* (2006.01)
*B29L 31/00* (2006.01)

(52) U.S. Cl.
CPC ............... *B29C 2049/4664* (2013.01); *B29L 2031/7158* (2013.01)

(56) References Cited

U.S. PATENT DOCUMENTS

| | | | | |
|---|---|---|---|---|
| 2012/0207872 | A1* | 8/2012 | Lisch | B29C 49/12 425/524 |
| 2012/0266567 | A1* | 10/2012 | Haesendonckx | B29C 49/46 53/558 |
| 2014/0367895 | A1* | 12/2014 | Sato | B29C 49/58 264/532 |
| 2015/0328823 | A1* | 11/2015 | Kannengiesser | B65B 3/022 206/525 |
| 2017/0021553 | A1* | 1/2017 | Kharchenko | B29C 49/783 |

FOREIGN PATENT DOCUMENTS

| | | | |
|---|---|---|---|
| EP | 2 832 682 | A1 | 2/2015 |
| JP | 2000062009 | A * | 2/2000 |
| JP | 2016-504219 | A | 2/2016 |
| JP | 2016-083816 | A | 5/2016 |
| JP | 2016-088086 | A | 5/2016 |
| WO | 2014/095384 | A1 | 6/2014 |
| WO | 2015/079627 | A1 | 6/2015 |
| WO | 2015/136368 | A2 | 9/2015 |

OTHER PUBLICATIONS

Machine translation JP2000062009A (Year: 2000).*
Dec. 18, 2019 Extended Search Report issued in European Patent Application No. 17806136.2.
Apr. 18, 2017 International Search Report issued in International Patent Application No. PCT/JP2017/011236.
Feb. 27, 2020 Office Action issued in Chinese Patent Application No. 201780026533.9.

* cited by examiner

CONTAINER PRODUCTION METHOD

TECHNICAL FIELD

The present disclosure relates to a container production method of producing a container that contains a content liquid by liquid blow molding a synthetic resin preform.

BACKGROUND

Synthetic resin containers, typical examples of which are polypropylene (PP) bottles and polyethylene terephthalate (PET) bottles, are used for applications in which a variety of liquids such as beverages, cosmetic products, pharmaceutical products, detergents and toiletries including shampoo are contained as a content liquid. Such a container is generally produced by blow molding a preform formed into a substantially test tube shape by a thermoplastic resin material as described above.

As a blow molding in which a preform is molded into a container, liquid blow molding is known in which, as a pressurizing medium supplied into a preform, a pressurized liquid is used instead of a pressurized air.

Further, as illustrated in PTL 1, for example, a container production method is known in which a container that contains a content liquid is produced by using a liquid (content liquid) such as beverage finally contained in a container as a pressurizing medium used for liquid blow molding. With this container production method, a step of filling content liquid into a container after molding can be omitted. Thus the production step or the configuration of the production line (device) can be simplified.

CITATION LIST

Patent Literature

PTL 1: JP2016504219A

SUMMARY

Technical Problem

As with the above described conventional container production method, when a liquid finally contained in a container is used as a pressurizing medium used for liquid blow molding, preferably, a properly sized headspace (a space not filled with a content liquid) is formed in a container after molding to prevent the content liquid from leaking from a mouth. In particular, when a cap for mounting a discharge apparatus with a pump is attached to a mouth of the container in a capping step after the container is molded, a pump mechanism is inserted into the container. Thus a headspace which is larger than that for attaching a spout plug or a closing cap is required.

In order to form a headspace of a desirable size corresponding to a subject to be attached to the mouth of the container, in the above described conventional container production method, as a blow molding mold, one having a built-in compression tab (pressing portion) is used. Then, after a preform is molded into a shape conforming to a cavity of a blow molding mold by liquid blow molding, the compression tab is projected toward the inside of the cavity such that a trunk of the container after molding is pressed with this compression tab. Thus a predetermined amount of content liquid is discharged from the inside of the container after molding to the outside of the container and a headspace of a predetermined amount is formed in the container.

However, with this method, a blow molding mold of a complicated configuration containing a compression tab and its drive mechanism is needed to be used, which causes an increase in production cost of the container.

The present disclosure has been conceived in view of the above problem, and is to provide a container production method in which a headspace of a desired size can be formed in a container without making a configuration of the blow molding mold complicated.

Solution to Problem

The container production method according to the present disclosure is a container production method in which a container that contains a content liquid is produced by liquid blow molding a synthetic resin preform, the method including: a preform setup step of disposing the preform in a blow molding mold that is releasable by being separated into a plurality of separated mold pieces and engaging a filling nozzle connected to a liquid supply path with a mouth of the preform; a blow molding step of liquid blow molding the preform into a shape conforming to a cavity of the blow molding mold by supplying a pressurized liquid supplied to the liquid supply path from the filling nozzle into the preform; a liquid discharge step of releasing the blow molding mold and pressing a trunk of the container after molding with a pressing portion inserted from a clearance of the separated mold pieces adjacent to each other to discharge a liquid in the container to the outside of the container by a predetermined amount; and a headspace forming step of forming a headspace in the container by separating the filling nozzle from a mouth of the container after a predetermined amount of liquid is discharged to the outside.

According to the above disclosed container production method, in the above described liquid discharge step, preferably, the truck of the container is pressed by the pressing portion with the filling nozzle opened with respect to the liquid supply path such that a liquid in the container is returned to the liquid supply path through the filling nozzle, and in the headspace forming step, the filling nozzle is separated from the mouth after the filling nozzle is closed with respect to the liquid supply path.

According to the above disclosed container production method, in the liquid discharge step, preferably, the trunk of the container is pressed by the pressing portion with the filling nozzle closed with respect to the liquid supply path and with a discharge path branched from the filling nozzle opened to discharge the liquid in the container to the outside through the discharge path, and in the headspace forming step, the filling nozzle is separated from the mouth after the discharge path is closed.

According to the above disclosed container production method, preferably, in the liquid discharge step, the trunk of the container after molding is pressed with the trunk sandwiched between a pair of the pressing portions disposed with each front end thereof opposed to each other in a horizontal posture.

According to the above disclosed container production method, in the blow molding step, preferably, the preform is axially stretched by a stretching rod, and in the liquid discharge step, the trunk of the container after molding is pressed by the pressing portion after the stretching rod is pulled out from the inside of the container after molding.

Advantageous Effect

According to the present disclosure, a container production method is provided in which a headspace of a desired size can be formed in a container without complicating a configuration of a blow molding mold.

DETAILED DESCRIPTION

Figure 1:
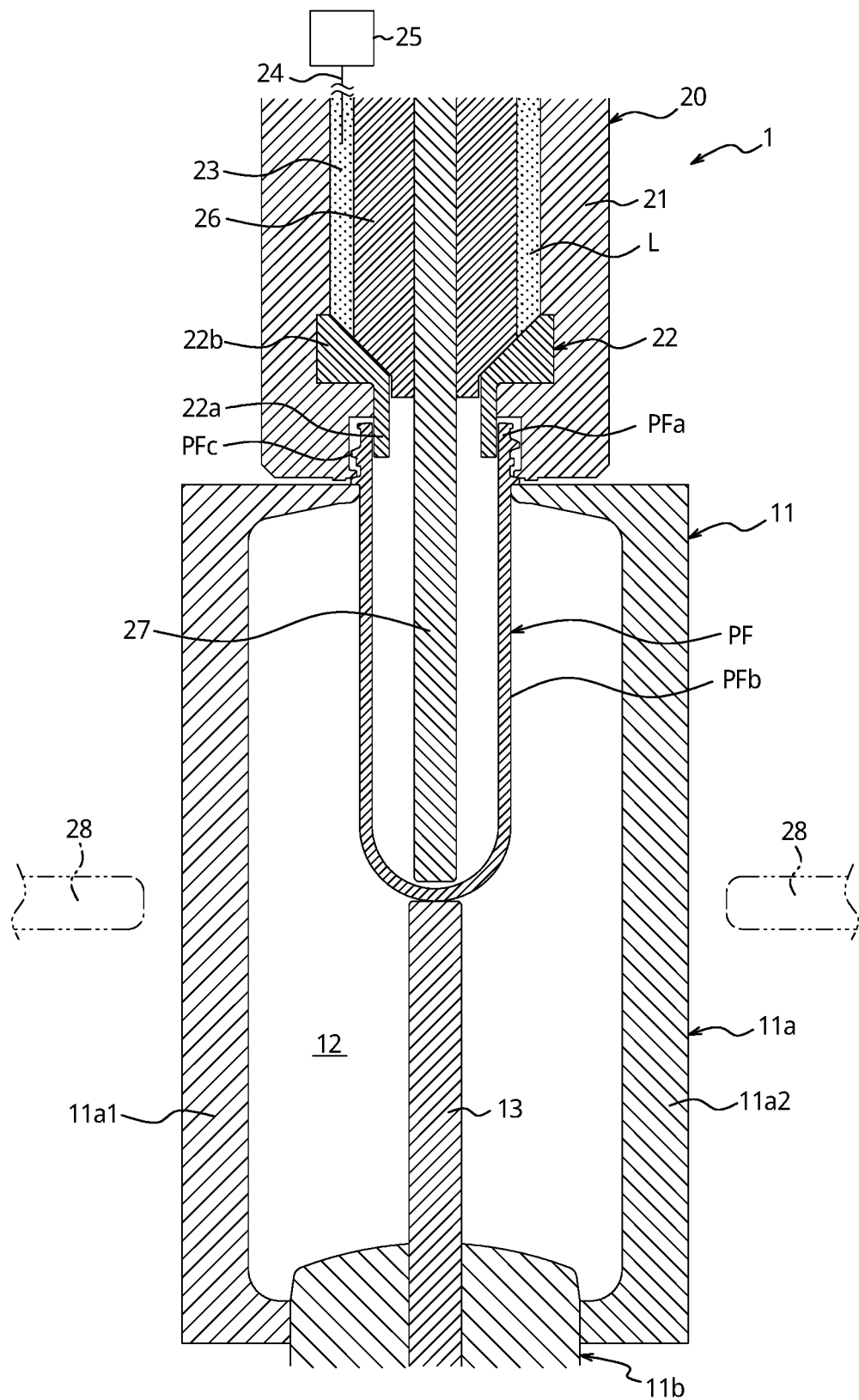
FIG. 1 is a longitudinal cross-sectional view illustrating a state where a preform is set in a liquid blow molding apparatus in a preform setup step of a container production method according to an embodiment of the present disclosure.

The present disclosure will be described in more detail below with reference to drawings.

The container production method of an embodiment of the present disclosure is a container production method in which a container that contains a content liquid is produced by liquid blow molding a synthetic resin preform, the method including: a preform setup step of disposing a preform in a blow molding mold that is releasable by being separated into a plurality of separated mold pieces and engaging a filling nozzle connected to a liquid supply path with a mouth of the preform; a blow molding step of liquid blow molding the preform into a shape conforming to a cavity of the blow molding mold by supplying a pressurized liquid supplied to the liquid supply path from the filling nozzle into the preform; a liquid discharge step of releasing the blow molding mold and pressing a trunk of the container after molding with a pressing portion inserted from a clearance of the separated mold pieces adjacent to each other to discharge a liquid in the container to the outside of the container by a predetermined amount; and a headspace forming step of forming a headspace in the container by separating the filling nozzle from a mouth of the container after a predetermined amount of liquid is discharged to the outside.

The above-described container production method can be performed by using a liquid blow molding apparatus 1 configured as illustrated in FIGS. 1 to 7, for example.

The liquid blow molding apparatus 1 produces a liquid-containing container C that contains a liquid (content liquid) L inside thereof and has a headspace HS of a predetermined size by liquid blow molding a synthetic resin preform PF. It is to be noted that the liquid blow molding is a blow molding in which a pressurized liquid L is supplied to the preform PF to mold the preform PF into a container C of a shape conforming to a cavity 12 of the blow molding mold 11.

As the liquid L supplied to the preform PF in the liquid blow molding, a liquid that is contained, as a content liquid L, in the container C after molding is used. Examples of such a liquid L include, for example, beverages, cosmetics, chemicals, detergents and toiletries such as shampoo.

As the preform PF, a preform formed into a substantially test tube shape including a cylindrical mouth PFa, which is an open end, and a bottomed cylindrical trunk PFb that is connected to the mouth PFa and has a closed bottom end can be used. The preform PF is formed by injection molding, direct blow molding, extrusion molding and the like, by using thermoplastic synthetic resins such as polypropylene (PP) and polyethylene terephthalate (PET) or the like as a material.

The shape of the preform PF is not limited to the above described ones, and a preform PF having a variety of shapes and made of a variety of materials can be used depending on the shape or the material of the container C after molding.

On the outer wall surface of the mouth PFa, a mouth Ca of the container C after molding is integrally provided with a male thread PFc used for mounting a closing cap that closes the mouth Ca, a spout cap provided with a spout nozzle or the like, or a cap for mounting a discharge apparatus with a pump (not illustrated). It is to be noted that, instead of the male thread PFc, an engaging protrusion configured to mount a variety of caps described above by plugging (undercut engagement) may be provided on the outer wall surface of the mouth PFa.

After being heated in advance to a predetermined temperature at which stretchability is achieved by using a heating means such as a heater or the like, the preform PF is disposed in the blow molding mold 11 in a standing posture in which the trunk PFb is disposed in the cavity 12 and the mouth PFa protrudes upward from the cavity 12 as illustrated in FIG. 1.

The cavity 12 of the blow molding mold 11 is formed into a shape corresponding to a final shape of a container such as a bottle shape, for example. The cavity 12 opens upward on an upper surface of the blow molding mold 11, and allows the mouth PFa of the preform PF to protrude upward from the opening as described above.

The blow molding mold 11 includes an outer peripheral mold portion 11a and a bottom mold portion 11b, and is formed by combining them.

The outer peripheral mold portion 11a defines and forms a portion of the cavity 12 that corresponds to the trunk Cb of the container C. The outer peripheral mold portion 11a includes a pair of right and left separated mold pieces 11a1 and 11a2 and is configured to be separated into right and left. The cavity 12 is divided symmetrically such that it corresponds to a pair of separated mold pieces 11a1 and 11a2.

The outer peripheral mold portion 11a can be separated, with the axial center of the container C or the cavity 12 defined as the center, toward the radial direction of the axial center. The blow molding mold 11 can be released by opening the outer peripheral mold portion 11a right and left by moving it in the direction in which the separated mold pieces 11a1 and 11a2 are separated from each other. The container C after molding can be taken out from the blow molding mold 11 by releasing it as described above after the preform PF is molded into the container C by liquid blow molding.

It is to be noted that, in the present embodiment, although the outer peripheral mold portion 11a is configured such that it can be separated into a pair of right and left separated mold pieces 11a1 and 11a2, it is not limited thereto, and as far as the outer peripheral mold portion 11a is configured such that it can be separated into a plurality of separated mold pieces to release the blow molding mold 11, the dividing configuration may be changed in various manners. For example, the outer peripheral mold portion 11a may be configured such that it is divided into three in the circumferential direction, or the outer peripheral mold portion 11a may be configured such that it is divided into a pair of separated mold pieces and is released in a pivotal manner, in which the separated mold pieces are coupled to each other by a hinge on one of divided face sides and are separated on the other divided face side.

Figure 3:
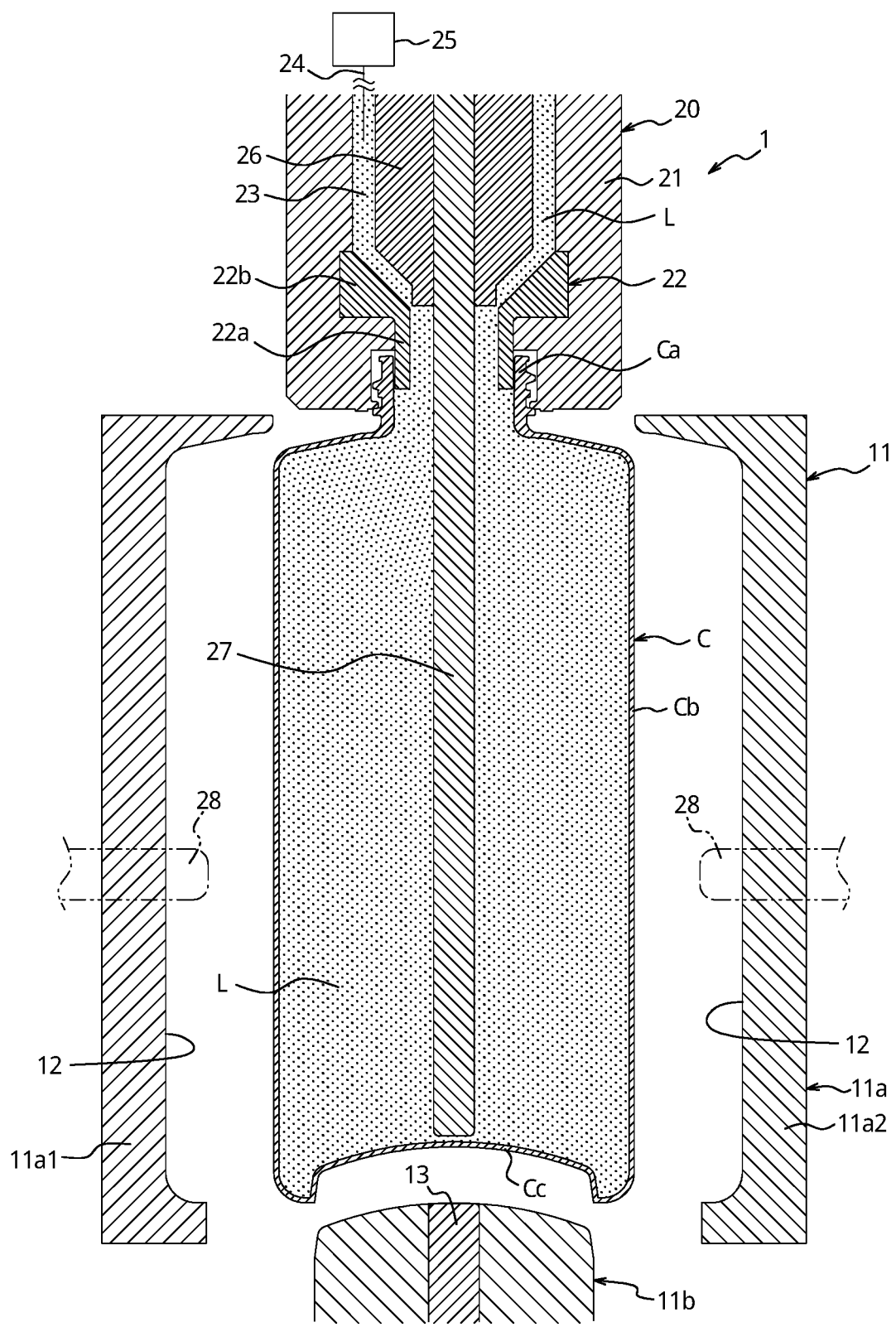
FIG. 3 is a longitudinal cross-sectional view illustrating a state where the blow molding mold is released in a liquid discharge step of the container production method according to an embodiment of the present disclosure.

The bottom mold portion 11b defines and forms a portion of the cavity 12 that corresponds to a bottom Cc of the container C, and is formed into an upward convex shape. As illustrated in FIG. 3, the bottom mold portion 11b is movable downward with respect to the outer peripheral mold portion 11a, and can retract from the bottom Cc of the container C, the bottom Cc being formed into an upward concave shape, by moving downward after the preform PF is molded into the container C by liquid blow molding.

The bottom mold portion 11b is provided with a pick pin 13 that vertically passes through the axial center of the bottom mold portion 11b. The pick pin 13 is movable between the position where it is buried in the bottom mold portion 11b and the position where it protrudes into the cavity 12 along the axial center of the cavity 12. It is to be noted that the bottom mold portion 11b may not be provided with the pick pin 13.

A nozzle unit 20 is provided above the blow molding mold 11 such that it is vertically movable with respect to the blow molding mold 11. The nozzle unit 20 includes a main body block 21 and a filling nozzle 22.

The filling nozzle 22 is configured by integrally forming a nozzle body 22a formed into a cylindrical shape that is inserted into the mouth PFa of the preform PF and a large-diameter holding portion 22b integrally formed with the nozzle body 22a by using steel and resin material or the like, for example. The filling nozzle 22 is fixed to the main body block 21 by fitting the holding portion 22b into the main body block 21. The nozzle body 22a is disposed coaxially with the cavity 12 of the blow molding mold 11, and is configured to engage with the mouth PFa of the preform PF mounted to the blow molding mold when the nozzle unit 20 is brought down to a predetermined position.

A liquid supply path 23 configured to vertically extend coaxially with the nozzle body 22a is provided in the main body block 21. The liquid supply path 23 is provided to supply a liquid L to the filling nozzle 22, and communicates with the filling nozzle 22 at the lower end thereof.

A pressurizing liquid supply portion 25 is connected to the liquid supply path 23 through a piping 24. The pressurizing liquid supply portion 25 can supply a liquid L pressurized up to a predetermined pressure to the liquid supply path 23 through the piping 24. As the pressurizing liquid supply portion 25, those configured to use a plunger pump as a pressurizing source can be used.

When a pressurized liquid L is supplied from the pressurizing liquid supply portion 25 to the liquid supply path 23, the liquid L is supplied from the liquid supply path 23 into the preform PF disposed in the blow molding mold 11 through the filling nozzle 22. Thus, the preform PF is liquid blow molded into a container C of a shape conforming to the cavity 12 of the blow molding mold 11 by the pressurized liquid L.

A seal body 26 configured to open and close the filling nozzle 22 with respect to the liquid supply path 23 is disposed in the liquid supply path 23. The seal body 26 is formed into a cylindrical shape extending along the axial center of the liquid supply path 23, and is vertically movable in the liquid supply path 23. When the seal body 26 moves to the lower stroke end and its lower end face comes in contact with the upper face of the holding portion 22b, communication between the liquid supply path 23 and the nozzle body 22a is blocked by the seal body 26, and the filling nozzle 22 is closed with respect to the liquid supply path 23. On the other hand, when the seal body 26 moves upward from its closing state and its lower end face separates from the upper face of the holding portion 22b, the liquid supply path 23 and the nozzle body 22a are communicated with each other and the filling nozzle 22 is opened with respect to the liquid supply path 23.

Therefore, when the pressurizing liquid supply portion 25 is operated with the nozzle body 22a engaged with the mouth PFa of the preform PF and the seal body 26 opened such that the liquid supply path 23 communicates with the filling nozzle 22, the preform PF is liquid blow molded by supplying a pressurized liquid L from the pressurizing liquid supply portion 25 into the preform PF through the liquid supply path 23 and the filling nozzle 22.

As illustrated, the liquid blow molding apparatus 1 may include a stretching rod 27. The stretching rod 27 is inserted into the axial center of the seal body 26 such that it is vertically movable relative to the seal body 26, and is retractable from the lower end of the seal body 26 toward the inside of the cavity 12. When the stretching rod 27 is moved downward, the preform PF can be axially stretched by the stretching rod 27. In this manner, when the stretching rod 27 is provided, the liquid blow molding apparatus 1 can perform biaxial stretch blow molding in which the preform PF is axially stretched by the stretching rod 27 while being radially stretched by the pressurized liquid L. In this case, when the biaxial stretch blow molding is performed while the bottom of the trunk PFb of the preform PF is supported by the pick pin 13, misalignment of the preform PF can be suppressed and the preform PF can be molded into the container C more precisely.

It is to be noted that the liquid blow molding apparatus 1 may not include the stretching rod 27

The liquid blow molding apparatus 1 is provided with a pair of pressing portions 28, which is configured to press the trunk Cb of the container C after molding with the blow molding mold 11 released after the preform PF is liquid blow molded such that a liquid L is discharged from the inside of the container C to the outside (in this embodiment, the liquid supply path 23) by a predetermined amount.

These pressing portions 28 are respectively formed by steel or the like into a rod shape, and are disposed in a horizontal posture with each front end thereof opposed to each other across the axial center of the cavity 12. The pressing portions 28 are respectively driven by a driving portion not illustrated and can move in the direction where each front end can move toward each other.

Figure 5A:
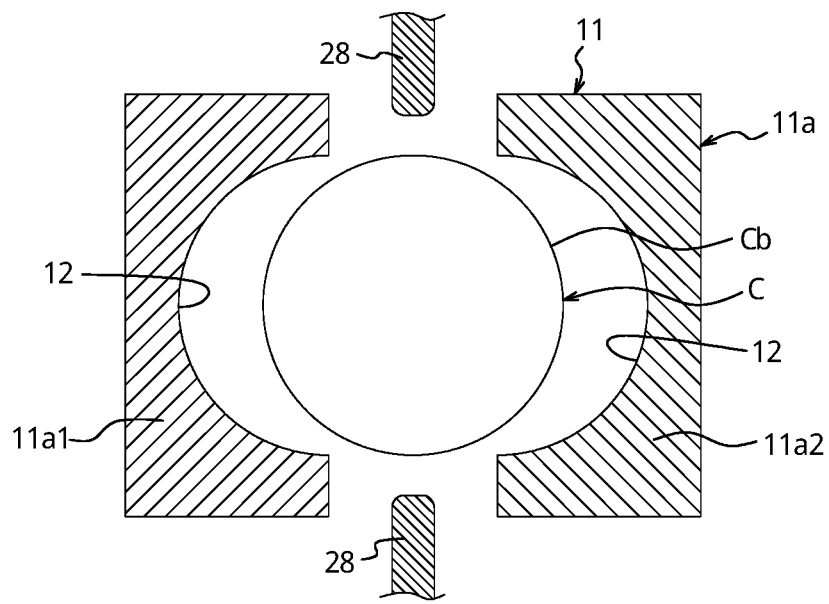
FIG. 5A is a horizontal cross-sectional view illustrating a procedure of pressing the trunk of the container after molding with the pressing portion.
Figure 5B:
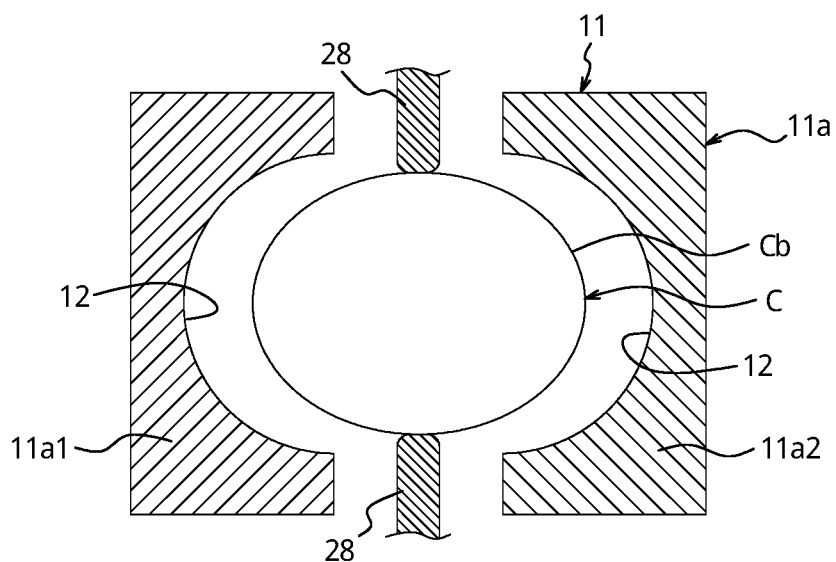
FIG. 5B is a horizontal cross-sectional view illustrating a procedure of pressing the trunk of the container after molding by the pressing portion.

As illustrated in FIG. 5, these pressing portions 28 are disposed along the divided face of the outer peripheral mold portion 11a, that is, the face where the separated mold pieces 11a1 and 11a2 are combined, and are inserted from the clearance between the separated mold pieces 11a1 and 11a2 adjacent to each other toward the trunk Cb of the container C when each of separated mold pieces 11a1 and 11a2 is moved away from each other and the blow molding mold 11 is released after the preform PF is molded into the container C by liquid blow molding. Further, for the pressing portions 28, each of their front ends comes in contact with the trunk Cb of the container C after molding from its side and presses the trunk Cb toward the inside thereof. Thus the liquid L in the container C is discharged from the mouth Ca thereof to the outside, that is, the liquid supply path 23, through the filling nozzle 22.

At this time, the trunk Cb is pressed while being sandwiched between a pair of pressing portions 28, so that the trunk Cb can be pressed more effectively.

Figure 2:
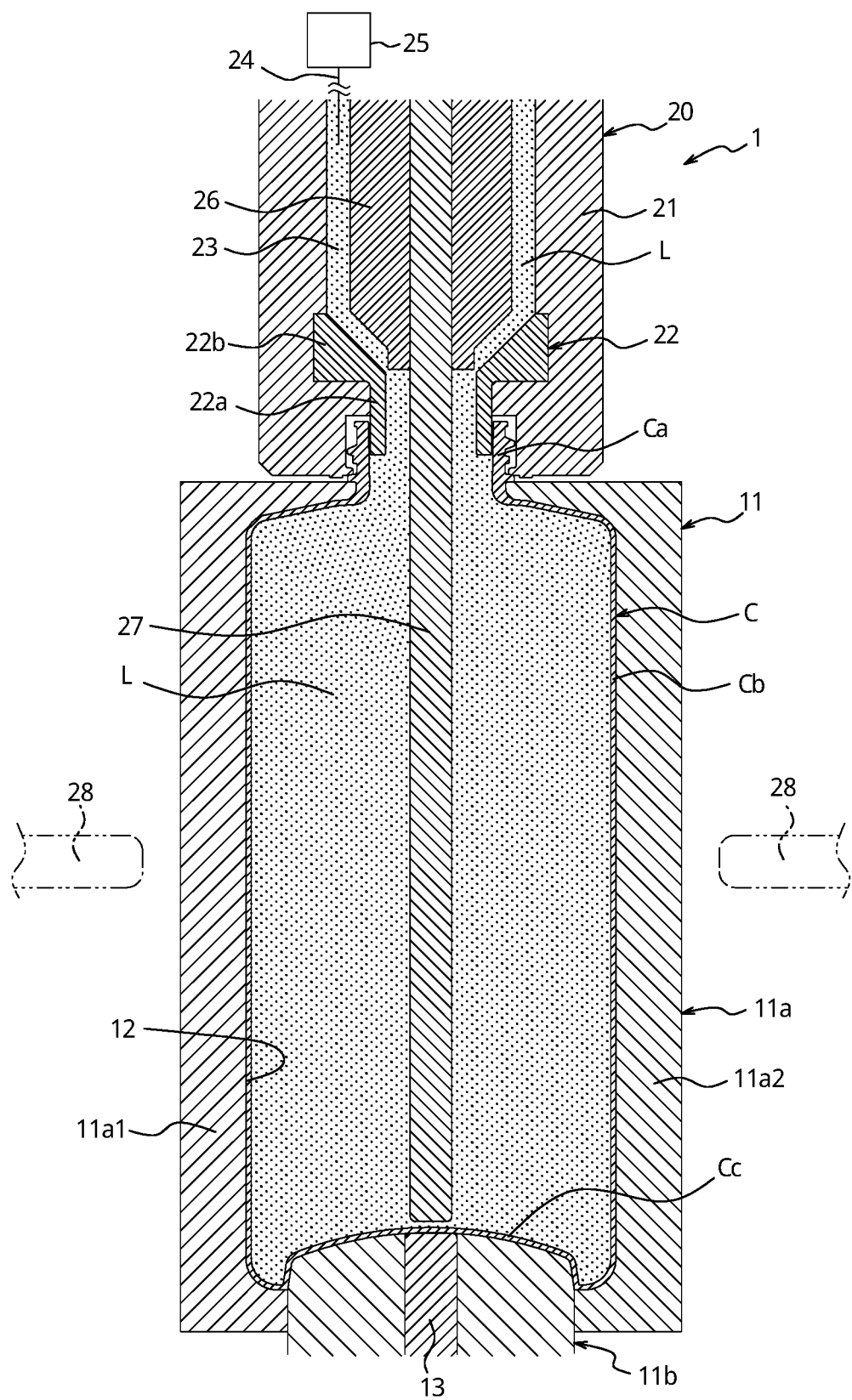
FIG. 2 is a longitudinal cross-sectional view illustrating a state where the preform is liquid blow molded in a blow molding step of the container production method according to an embodiment of the present disclosure.

It is to be noted that, as described above, although the pressing portions 28 are disposed along the divided face of the outer peripheral mold portion 11a, that is, a face where separated mold pieces 11a1 and 11a2 are combined, for convenience sake, in FIGS. 1 to 3, the pressing portions 28 are illustrated behind the separated mold pieces 11a1 and 11a2 by the double chain line.

Next, a method of producing a container C of a predetermined shape that contains a content liquid L by liquid blow molding a synthetic resin preform PF by using the liquid blow molding apparatus 1 configured in the above described manner (the disclosed container production method) will be described.

First, a preform setup step is performed. In the preform setup step, as illustrated in FIG. 1, the preform PF heated in advance to a predetermined temperature (e.g. from 80° C. to 150° C.) around which stretchability is achieved by using a heating means (not illustrated) such as a heater is disposed in the blow molding mold 11 and is clamped. Then the nozzle unit 20 is brought down and the nozzle body 22a of the filling nozzle 22 is engaged with the mouth PFa of the preform PF. It is to be noted that, in the preform setup step, the filling nozzle 22 is closed by the seal body 26 and the pressurizing liquid supply portion 25 is stopped.

When the preform setup step is finished, subsequently the blow molding step is performed. In the blow molding step, as illustrated in FIG. 2, the seal body 26 is moved upward to open the filling nozzle 22 and to activate the pressurizing liquid supply portion 25. Thus, a pressurized liquid L is supplied from the pressurizing liquid supply portion 25 to the liquid supply path 23 and the liquid L is supplied from the mouth PFa into the preform PF through the filling nozzle 22. Then, the pressurized liquid L is supplied into the preform PF, and thus the preform PF is liquid blow molded into a container C of a shape conforming to the cavity 12 of the blow molding mold 11.

In the blow molding step, the biaxial stretch blow molding can be performed by stretching the preform PF in the longitudinal (axial) direction by using the stretching rod 27. In this case, supply of liquid L may be started during or after the axial stretching by the stretching rod 27. With the biaxial stretch blow molding, misalignment of the preform PF during molding can be suppressed. It is to be noted that it is not necessary for the stretching rod 27 to stretch the preform PF from the beginning, and after the preform PF is axially stretched to some extent only by liquid L, the preform PF may be axially stretched further by the stretching rod 27.

Further, in this case, the preform PF can be axially stretched while the bottom of the trunk PFb of the preform PF is supported by the pick pin 13 (that is, while the preform PF is sandwiched between the lower end of the stretching rod 27 and the upper end of the pick pin 13). With this configuration, misalignment of the preform PF during molding can be suppressed more reliably. It is to be noted that it is not necessary for the pick pin 13 to support the preform PF from the beginning, and it may support the preform PF after the preform PF is axially stretched to some extent.

When the blow molding step is finished, subsequently the liquid discharge step is performed. In the liquid discharge step, first, as illustrated in FIG. 3, the filling nozzle 22 is opened, and the blow molding mold 11 is released with the pressurizing liquid supply portion 25 remained stopped.

Figure 4:
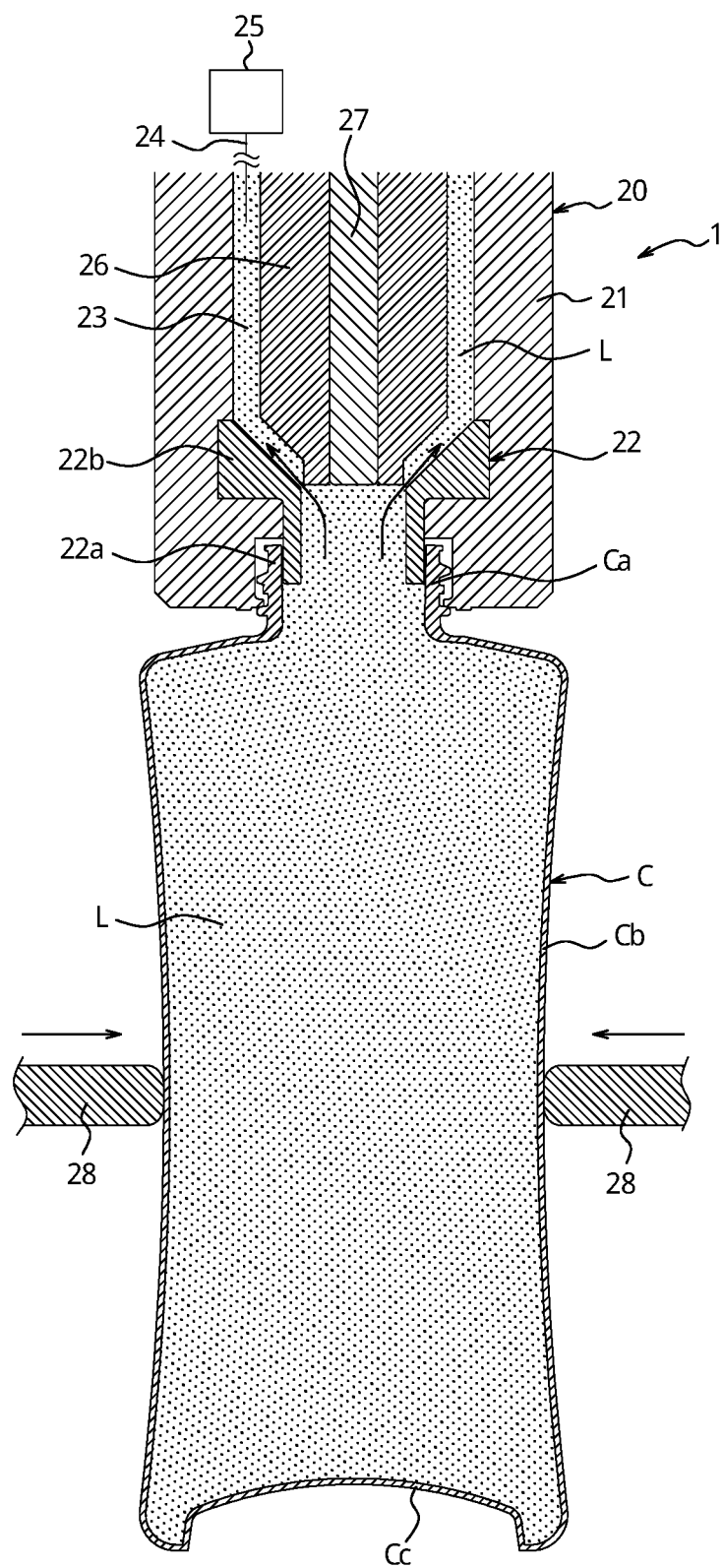
FIG. 4 is a longitudinal cross-sectional view illustrating a state where a trunk of the container after molding is pressed with a pressing portion in a liquid discharge step of the container production method according to an embodiment of the present disclosure.

Subsequently, as illustrated in FIGS. 4 and 5, the filling nozzle 22 is opened, and the pressing portion 28 is inserted into the clearance between the separated mold pieces 11a1 and 11a2 adjacent to each other with the blow molding mold 11 remained released, and the trunk Cb of the container C after molding is pressed by the pressing portion 28. Thus, the trunk Cb of the container C is sandwiched between a pair of pressing portions 28 and is elastically deformed into a flat shape so that the amount of content is decreased, and the liquid L contained in the container C is discharged from the mouth Ca to the outside of the container C by a predetermined amount. The liquid L discharged from the mouth Ca of the container C is returned to the liquid supply path 23 through the filling nozzle 22. It is to be noted that the amount of the liquid L discharged from the inside of the container C can be set to a desired amount by changing a pressed amount of the pressing portion 28. Thus, a predetermined amount of liquid L is discharged from the inside of the container C after molding by deforming the trunk Cb of the container C, and as a result, the container C will be in a state where a liquid L of an amount smaller than its full amount is contained therein.

It is to be noted that, in the present embodiment, after the blow molding step, release of the blow molding mold 11 and press of the trunk Cb of the container C by the pressing portion 28 are performed with the filling nozzle 22 remained opened with respect to the liquid supply path 23. However, it is also possible that the trunk Cb of the container C is pressed by the pressing portion 28 such that the liquid L in the container C is discharged to the liquid supply path 23 through the filling nozzle 22 after the filling nozzle 22 is closed with respect to the liquid supply path 23 and the blow molding mold 11 is released, then again the filling nozzle 22 is opened with respect to the liquid supply path 23 when the blow molding step is finished.

As with the present embodiment, when the biaxial stretch blow molding is performed by using the stretching rod 27 in the blow molding step, preferably, the trunk Cb is pressed by the pressing portion 28 after the stretching rod 27 is pulled out from the inside of the container C after molding. Thus, the container C is prevented from being deformed due to reduced pressure when the stretching rod 27 is pulled out from the inside of the container C, and the size of a headspace formed in the container C can be more precisely set.

Figure 6:
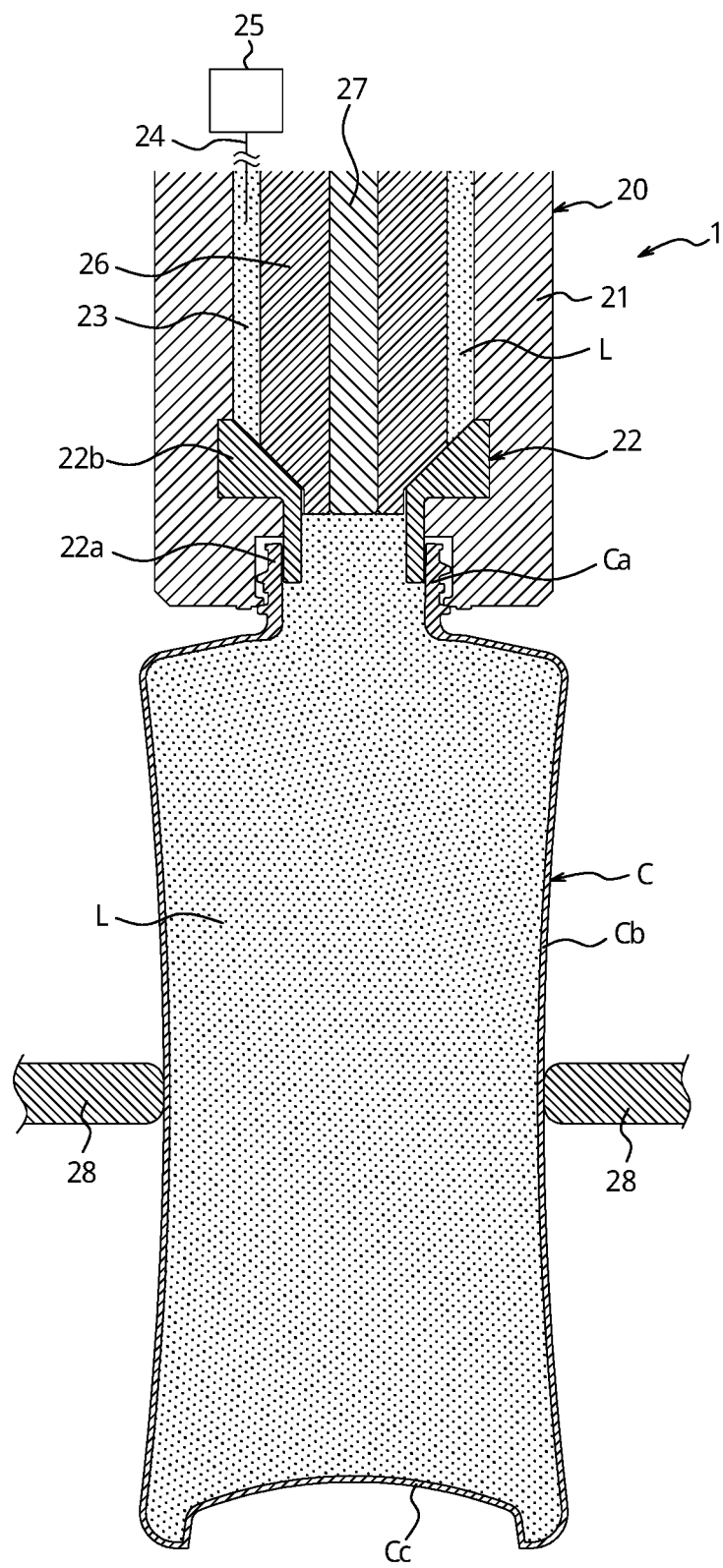
FIG. 6 is a longitudinal cross-sectional view illustrating a state where a filling nozzle is closed with respect to a liquid supply path while the trunk of the container is pressed by the pressing portion in a headspace forming step of the container production method according to an embodiment of the present disclosure.

When the liquid discharge step is finished, subsequently the headspace forming step is performed. In the headspace forming step, as illustrated in FIG. 6, first, the filling nozzle 22 is closed with respect to the liquid supply path 23 with the trunk Cb of the container C pressed by the pressing portion 28, that is, with a predetermined amount of liquid L discharged from the container C to the outside, and the communication between the liquid supply path 23 and the inside of the container C is blocked.

Figure 7:
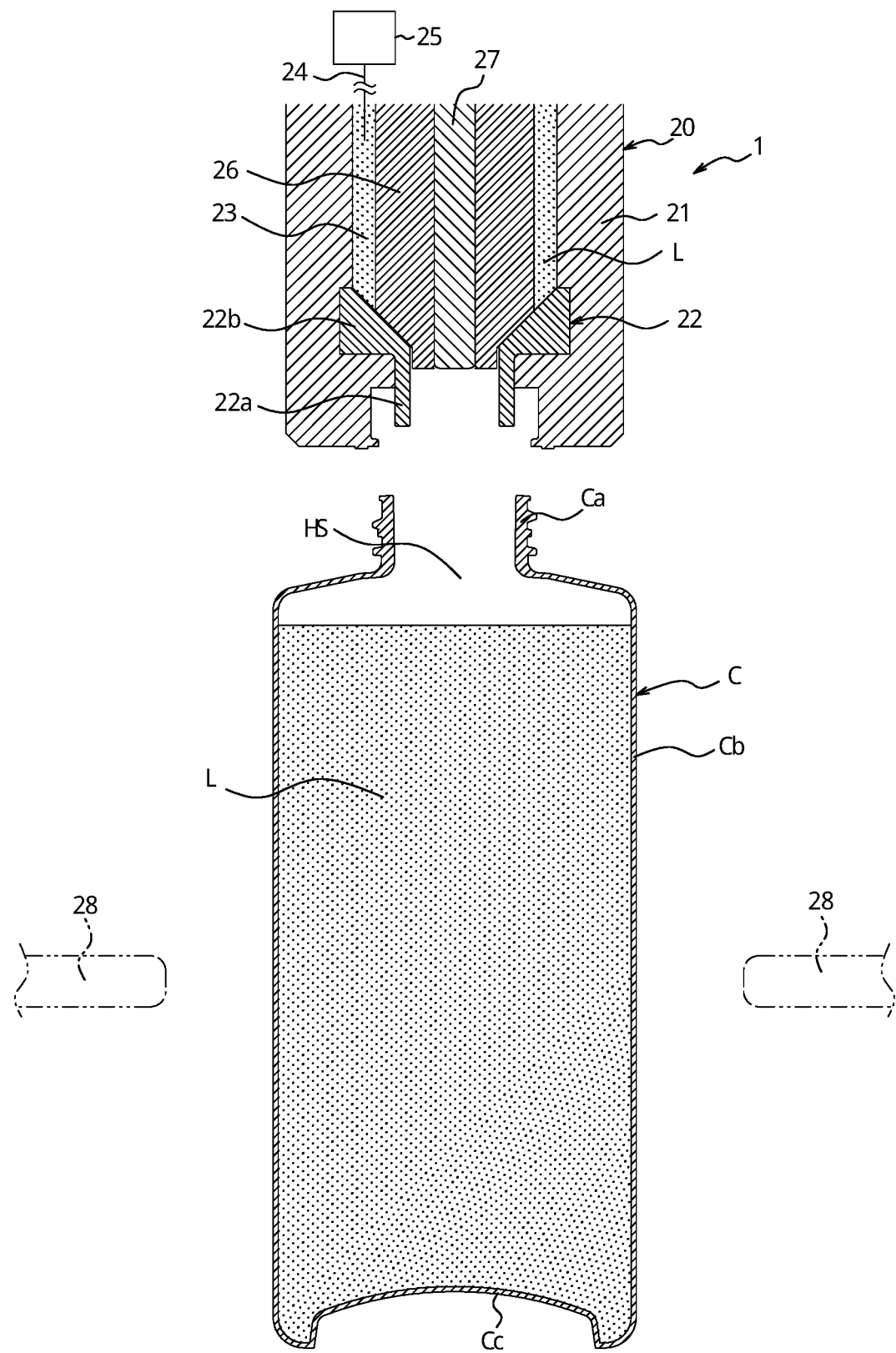
FIG. 7 is a longitudinal cross-sectional view illustrating a state where the filling nozzle is separated from a mouth of the container after molding in the headspace forming step of the container production method according to an embodiment of the present disclosure.

Subsequently, as illustrated in FIG. 7, the pressing portion 28 is returned to the original position where it separates from the trunk Cb of the container C and the nozzle unit 20 is raised to the original position such that the filling nozzle 22 is separated from the mouth Ca. At this time, the filling nozzle 22 is closed with respect to the liquid supply path 23 and communication between the liquid supply path 23 and the inside of the container C is blocked. Thus the liquid L does not return from the liquid supply path 23 to the container C when the filling nozzle 22 is separated. As a result of this, the trunk Cb of the container C is restored to a shape at the time of completion of the liquid blow molding, and a headspace HS of a desired size is precisely formed in the container.

As described above, according to the disclosed container production method, the blow molding mold 11 is released after the preform PF is liquid blow molded, and the pressing portion 28 provided separately from the blow molding mold 11 is inserted from the clearance between the separated mold pieces 11a1 and 11a2 of the blow molding mold 11 to press the trunk Cb of the container C after molding such that a predetermined amount of liquid L in the container C is discharged to the outside and a headspace HS is formed in the container C. Thus, a headspace HS of a desired size can be formed in the container C without using a complicated blow molding mold 11 with a built-in member corresponding to the pressing portion 28. In particular, even in the case of a batch-type liquid blow molding apparatus in which, as the blow molding mold 11, one that includes a plurality of cavities 12 disposed in series is used and a plurality of preforms PF are liquid blow molded at a time to produce a plurality of containers C, a plurality of pairs of pressing portions 28 corresponding to the cavities 12 can be easily disposed without allowing the blow molding mold 11 to be configured in a complicated manner. Therefore, a production cost of this container C can be reduced by using the blow molding mold 11 of a simple configuration.

Further, according to the present embodiment, in the liquid discharge step, the liquid L discharged from the container C is returned to the liquid supply path 23 through the filling nozzle 22, and thus the consumed amount of the liquid L can be reduced, and it is not necessary to separately provide a flow path configured to discharge liquid L, thus the configuration of the liquid blow molding apparatus 1 can be simplified. Therefore the production cost of the container C can be further reduced.

Figure 8:
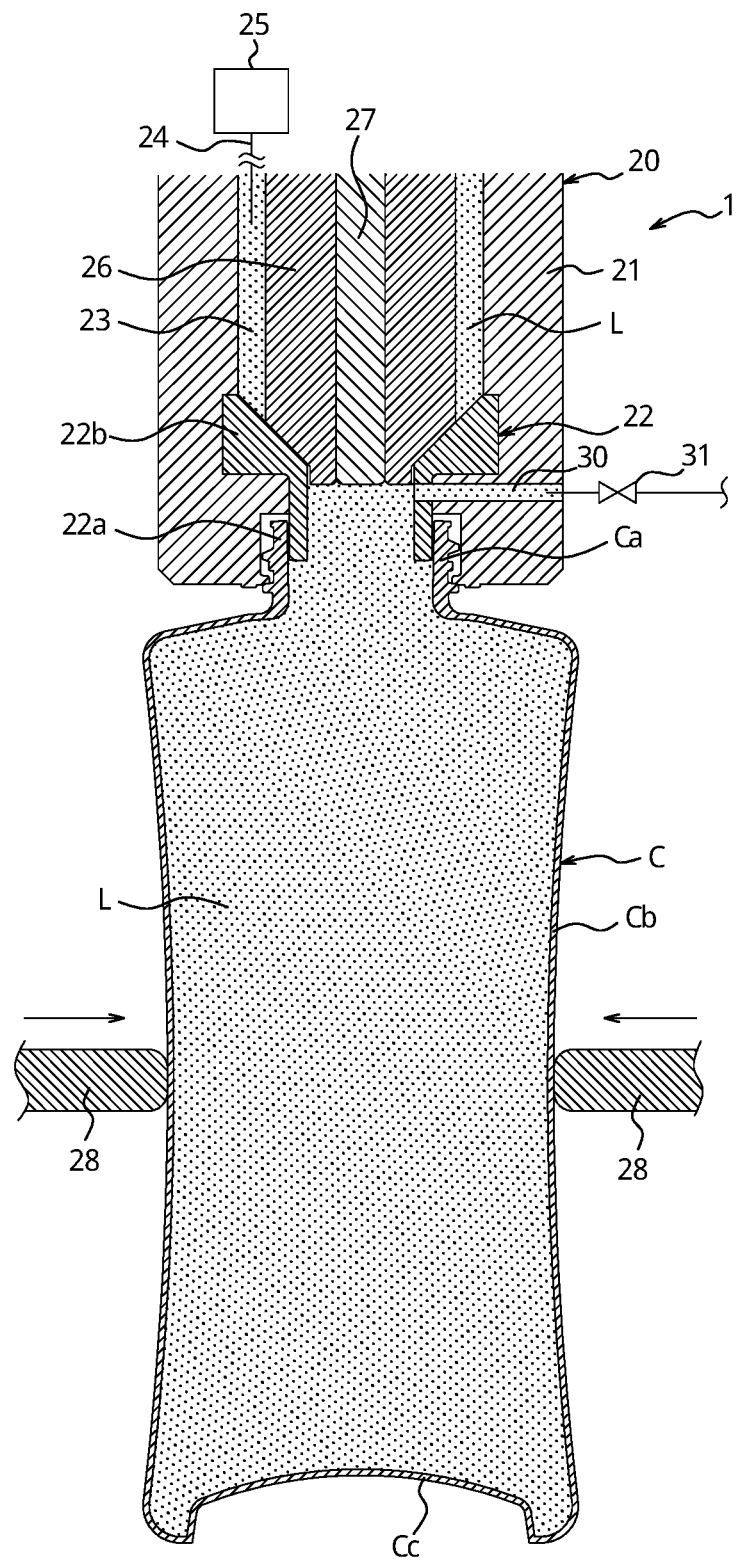
FIG. 8 is a longitudinal cross-sectional view illustrating a variation of the liquid discharge step and the headspace forming step of the container production method according to the present disclosure.

FIG. 8 is a longitudinal cross-sectional view for illustrating a variation of the liquid discharge step and the headspace forming step of the disclosed container production method. It is to be noted that, in FIG. 8, the members corresponding to the above described ones are assigned with the same reference signs.

In the case illustrated in FIGS. 1 to 7, in the liquid discharge step, the trunk Cb of the container C is pressed by the pressing portion 28 with the filling nozzle 22 opened with respect to the liquid supply path 23 so that the liquid L discharged from the container C is returned to the liquid supply path 23 through the filling nozzle 22. However, as illustrated in FIG. 8, the liquid L discharged from the container C may be discharged to the outside of the container C through the discharge path 30 branched from the filling nozzle 22.

In this case, in the liquid discharge step, the trunk Cb of the container C is pressed by the pressing portion 28 with the filling nozzle 22 closed with respect to the liquid supply path 23 and the opening-closing valve 31 provided at the discharge path 30 opened. Thus, the liquid L contained in the container C can be discharged to the outside through the discharge path 30 by a predetermined amount.

On the other hand, in the headspace forming step, the filling nozzle 22 is separated from the mouth Ca of the container C after the discharge path 30 is closed by the opening-closing valve 31. Thus, the liquid L left in the discharge path 30 is prevented from returning from the mouth Ca to the container C when the filling nozzle 22 is separated, and a headspace HS of a desired size can be precisely formed in the container C.

Needless to say, the present disclosure is not limited to the above described embodiment, and various changes may be made without departing from the gist of the present disclosure.

For example, in the above described embodiment, although the disclosed container production method is performed by using the liquid blow molding apparatus 1 configured as illustrated in FIGS. 1 to 8, the disclosed container production method may be performed by using the liquid blow molding apparatus of the other configurations.

Further, in the above described embodiment, although the biaxial stretch blow molding is performed by using the stretching rod 27 in the blow molding step, stretching by using the stretching rod 27 may not be performed.

Moreover, the disclosed container production method can be applied not only to produce a container including a large headspace HS like a liquid-containing container C used for a container with a pump that contains a content liquid such as shampoo, but also applied to a variety of liquid-containing containers C regardless of the size of the headspace HS.

Moreover, in the above described embodiment, although the bottom mold portion 11b is brought down when the blow molding mold 11 is released, the container C may be supported by the bottom mold portion 11b when pressed by the pressing portion 28 without bringing down the bottom mold portion 11b.

REFERENCE SIGNS LIST

1 Liquid blow molding apparatus
11 Blow molding mold
11a Outer peripheral mold portion
11a1 Separated mold piece
11a2 Separated mold piece
11b Bottom mold portion
12 Cavity
13 Pick pin
20 Nozzle unit
21 Main body block
22 Filling nozzle
22a Nozzle body
22b Holding portion
23 Liquid supply path
24 Piping
25 Pressurizing liquid supply portion
26 Seal body
27 Stretching rod
28 Pressing portion
30 Discharge path
31 Opening-closing valve
PF Preform
PFa Mouth PFb Trunk
PFc Male thread
L Liquid (content liquid)
HS Headspace
C Container
Ca Mouth
Cb Trunk
Cc Bottom

The invention claimed is:

1. A container production method of producing a container that contains a content liquid by liquid blow molding a synthetic resin preform, the method comprising:
    a preform setup step of disposing the preform in a blow molding mold that is releasable by being separated into a plurality of separated mold pieces and engaging a filling nozzle connected to a liquid supply path with a mouth of the preform;
    a blow molding step of liquid blow molding the preform into a shape conforming to a cavity of the blow molding mold by supplying a pressurized liquid supplied to the liquid supply path from the filling nozzle into the preform;
    a liquid discharge step of releasing the blow molding mold and pressing a trunk of a container after molding with a pressing portion that is inserted from a clearance between the separated mold pieces adjacent to each other to discharge a liquid in the container to outside of the container by a predetermined amount; and
    a headspace forming step of forming a headspace in the container by separating the filling nozzle from a mouth of the container after a predetermined amount of liquid is discharged to outside,
    wherein, in the liquid discharge step, with an inside of the container blocked with respect to the liquid supply path by closing the filling nozzle with a seal body and with a discharge path branched from the filling nozzle opened, the liquid in the container is discharged to outside through the discharge path by pressing the trunk of the container by the pressing portion,
    wherein in the headspace forming step, the filling nozzle is separated from the mouth after the discharge path is closed,
    wherein the filling nozzle is configured to be opened and closed with respect to the liquid supply path by the seal body, wherein the discharge path branched from the filling nozzle is provided in a portion of the filling nozzle opposite to the liquid supply path with respect to the portion closed by the seal body.

2. The container production method according to claim 1, wherein the pressing portion includes a pair of pressing portions and in the liquid discharge step, the trunk of the container after molding is pressed with the trunk sandwiched between the pair of pressing portions disposed with each front end thereof opposed to each other in a horizontal direction.

3. The container production method according to claim 1, wherein, in the blow molding step, the preform is axially stretched by a stretching rod; and
    in the liquid discharge step, the trunk of the container after molding is pressed by the pressing portion after the stretching rod is pulled out from inside of the container after molding.

4. The container production method according to claim 2, wherein, in the blow molding step, the preform is axially stretched by a stretching rod; and
    in the liquid discharge step, the trunk of the container after molding is pressed by the pressing portion after the stretching rod is pulled out from inside of the container after molding.

* * * * *